US008421846B2

(12) United States Patent
Nelson et al.

(10) Patent No.: US 8,421,846 B2
(45) Date of Patent: Apr. 16, 2013

(54) SYSTEM AND APPARATUS FOR 3D IMAGE CAPTURE AND PROCESSING

(76) Inventors: J. Roy Nelson, Pennington, NJ (US); Randall E. McCoy, Little Falls, NJ (US)

( * ) Notice: Subject to any disclaimer, the term of this patent is extended or adjusted under 35 U.S.C. 154(b) by 1006 days.

(21) Appl. No.: 12/419,148

(22) Filed: Apr. 6, 2009

(65) Prior Publication Data

US 2010/0253970 A1 Oct. 7, 2010

(51) Int. Cl.
*H04N 13/00* (2006.01)
*H04N 13/02* (2006.01)

(52) U.S. Cl.
USPC .......................... 348/42; 348/47; 348/E5.051

(58) Field of Classification Search .................. None
See application file for complete search history.

(56) References Cited

U.S. PATENT DOCUMENTS

| 4,272,177 | A | * | 6/1981 | Ottenheimer | 396/423 |
| 4,956,705 | A | * | 9/1990 | Wright | 348/50 |
| 5,933,668 | A | * | 8/1999 | Hyers | 396/392 |
| 6,141,034 | A | * | 10/2000 | McCutchen | 348/36 |
| 2006/0139475 | A1 | * | 6/2006 | Esch et al. | 348/340 |

* cited by examiner

*Primary Examiner* — Wen-Tai Lin
(74) *Attorney, Agent, or Firm* — Leason Ellis LLP

(57) ABSTRACT

A jig supports an array of cameras on a platform using a plurality of brackets among which one is immovably secured to the platform at a center of the array while the remainder is pivotally connected to the platform. A computer-implemented system creates an interlaced image. The system includes a trigger mechanism operatively coupled to the cameras to effect nearly simultaneous image capture. A focal target and a sizing reference are provided at a focal position of the lenses. A computer having a processor and a memory executes code that interlaces bands of images captured from each of the cameras, at nearly a single point in time, into an interlaced image and processes the sizing reference and adjusts a size of one or more of the captured images for inclusion in the interlaced image.

7 Claims, 4 Drawing Sheets

SYSTEM AND APPARATUS FOR 3D IMAGE CAPTURE AND PROCESSING

FIELD OF THE INVENTION

The present invention relates to improvements in systems configured for the capture of 3D images and to the presentation of such images.

BACKGROUND OF THE INVENTION

Lenticular printing is a technology in which a lenticular lens is used to produce images with an illusion of depth, or the ability to change or move as the image is viewed from different angles. Lenticular printing is a multi-step process consisting of creating a lenticular image from at least two existing images and combining it with a lenticular lens. This process can be used to create various frames of animation (for a motion effect), offsetting the various layers at different increments (for a 3d effect), or simply to show a set of alternate images which may appear to transform into each other. Once the various images are collected, they are flattened into individual, different frame files, and then digitally combined into a single final file in a process called interlacing. Interlacing has slices of each image as strips which are interlaced with strips from one or more other images. From there, the interlaced image can be printed directly to the back (smooth side) of the lens or it can be printed to a substrate and laminated to the lens. When printing to the backside of the lens, registration of the fine "slices" of interlaced images must be controlled relative to the lenses during the lithographic or screen printing process or "ghosting" and poor imagery might result. When properly aligned, light reflected off each strip is refracted in a slightly different direction, but the light from all strips of a given image are sent in the same direction (parallel).

A stereoscopic effect can be produced when the lenticular lens is arranged for little change in viewing angle. In this way, each eye sees a slightly different view. This creates a 3D effect without requiring special glasses.

In order to capture the images used in a lenticular image, one or more cameras are typically moved about, and the images are taken in succession in as short an amount of time as possible. When the subject of the photo is a person or animal, for example, it is important to take the pictures in a short period of time to minimize distortion when the images are interlaced. In addition, the camera or cameras are typically mounted on a track for movement in order to capture images at a fixed position. Such movement can be both translational and rotational and varies with the distance to the subject. These systems, whether automated or manual, are costly and difficult to use and maintain.

Therefore, there is a need for improvements in systems that create interlaced images for stereoscopic presentations, and the present invention addresses that need.

SUMMARY OF THE INVENTION

In accordance with one aspect of the invention, a jig is arranged to support a plurality of cameras. The jig includes a platform and a plurality of brackets. The brackets are connectable to a respective one of the cameras and are secured to the platform in an array. A first bracket is immovably secured to the platform at a center of the array. A set of second brackets among the plurality of brackets is pivotally connected to the platform on a left side of the first bracket and pivotable toward the first bracket. Also, a set of third brackets among the plurality of brackets is pivotally connected to the platform on a right side of the first bracket and pivotable toward the first bracket.

A jig in accordance with the invention optionally can have a level mounted to the platform, and the brackets in the second and third sets can be secured against pivotal movement in a particular position.

In accordance with a further aspect of the invention, a computer-implemented system for creation of an interlaced image for stereoscopic presentation includes a plurality of cameras each having a lens, a trigger mechanism operatively coupled to the plurality of cameras to effect nearly simultaneous image capture from the cameras, a jig supporting a plurality of brackets thereupon. Each of the cameras is supported by a respective bracket on the jig. An aiming device is positionable at a focal position of the lenses. The aiming device provides a focal target and can include a sizing reference. The sizing reference can be on a separate object, but it is useful to have it coincide with the focal target. A computer having a processor and a memory executes code that interlaces bands of images captured from each of the cameras, at nearly a single point in time, into the interlaced image. The code is also operative to process the sizing reference and adjust a size of one or more of the captured images. The so-adjusted image is included in the interlaced image whereby distortion in the interlaced image is reduced.

A system in accordance with the foregoing aspect of the invention optionally can have a printer coupled to the computer and arranged to output the interlaced image. Also, the image can be output onto a rear surface of a lenticular lens. Optionally, the system has a laminator that receives the printer output and laminates the interlaced image in register with a lenticular lens.

These and further aspects, features and functionalities will be further appreciated with reference to the discussion below of certain embodiments of the invention and the accompanying drawing figures.

DISCUSSION OF CERTAIN EMBODIMENTS OF THE INVENTION

By way of overview and introduction, a multi-camera set-up enables stereoscopic image capture free of motors or complex arrangements to position the cameras. In part, the invention provides a jig adapted to provide close tolerance positioning of cameras in an array to focus on a fixed focal point. In another part, the invention provides a system that facilitates creation of a lenticular image.

Figure 1:
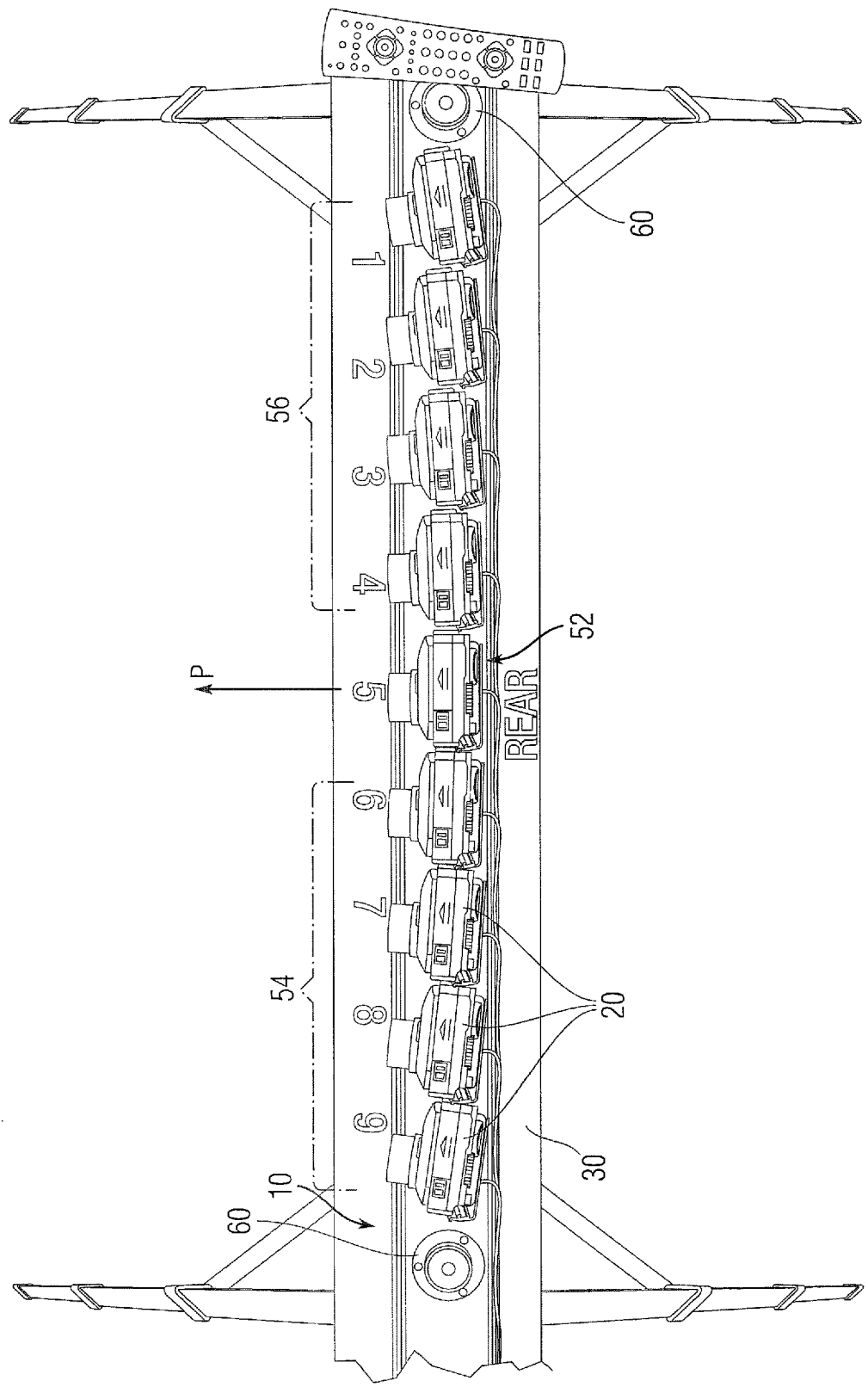
FIG. 1 is a top plan view of a jig configured to support a plurality of cameras in accordance with one aspect of the present invention.
Figure 2:
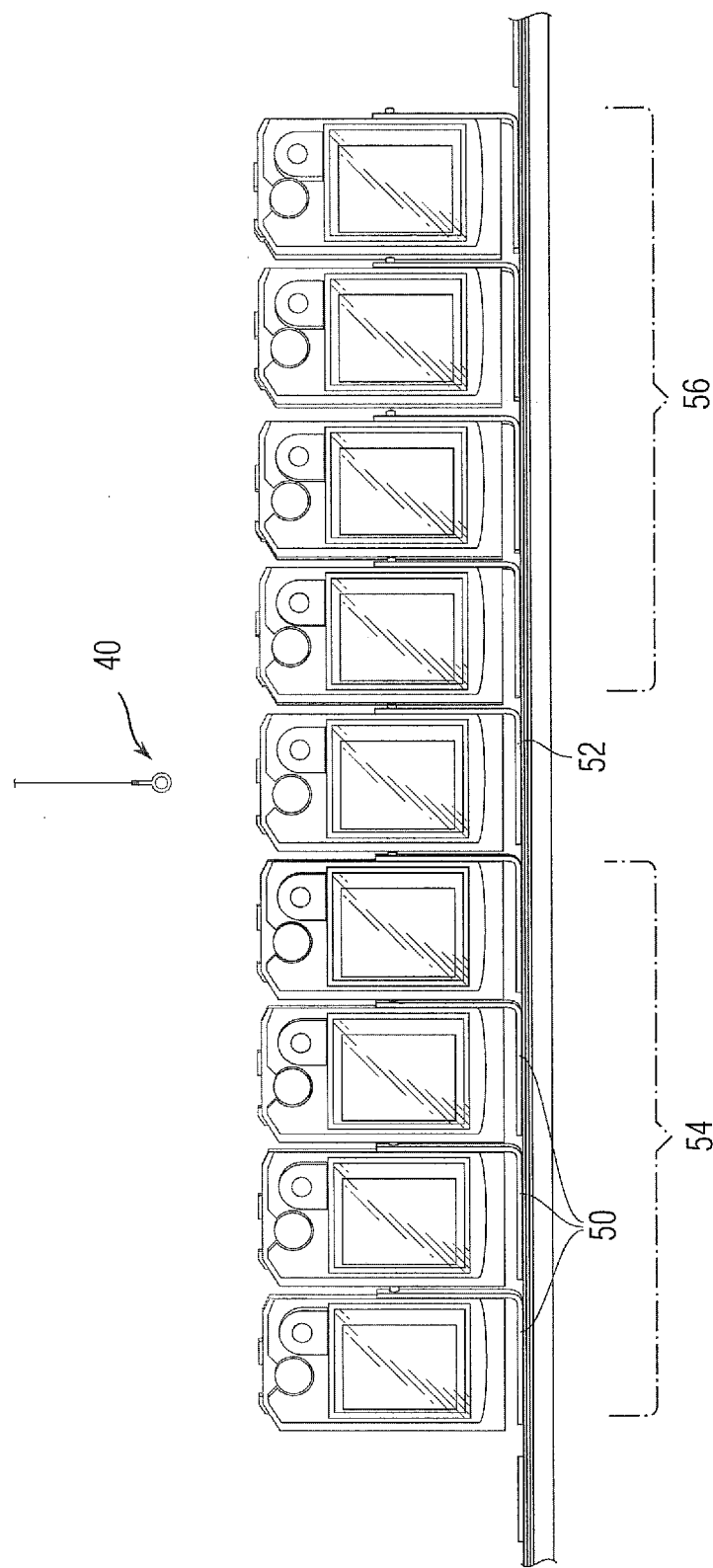
FIG. 2 is a rear view of the jig of FIG. 1, showing a target disposed at a focal point.

With reference now to FIGS. 1 and 2, an embodiment of a jig 10 that has actually been reduced to practice is illustrated in which nine cameras 20 are disposed upon a platform 30 in an array, such as a linear array or in as an arcuate array. Each camera has a lens 22 that is oriented toward a target 40. More specifically, brackets 50 are secured to the platform 30 and have mounted thereto a respective camera 20.

The platform preferably includes one or more levels 60 that enable leveling of the platform relative to the floor. A level platform ensures that the image captured across the array is truly horizontal, again, to reduce potential distortion when multiple images are combined. As illustrated, the jig 10 can include tripods to support the platform, though that is not required. Preferably, however, the platform includes or can be mated to a mechanical component that permits leveling of the surface that supports the cameras 20.

A center camera (adjacent the numeral "5" in FIG. 1) is preferably secured to the platform via the bracket so that its lens is absolutely square to the target 40. For instance, it can be mounted with its lens perpendicular to the platform, that is, in the direction of arrow P. The center camera does not require any adjustment, and as such it can be immovably secured by a first bracket 52 to the platform at the center of the array.

The remaining cameras are mounted to respective brackets on either side of the center camera at a fixed spacing relative to each other. A suitable center-to-center spacing of the camera lenses has been empirically determined to be approximately 2.5 inches. Each camera 20 is oriented at an angle relative to its adjacent neighbor. Preferably, the angle is approximately 2°, and is oriented toward the perpendicular P. Thus, as seen in FIG. 1, a set 54 of brackets 50 and associated cameras 20 to the left of bracket 52 is oriented so that each bracket in the set is angled toward the right, whereas a set 56 of brackets 50 and associated cameras 20 to the right of bracket 52 is oriented so that each bracket in the set is angled toward the left.

Other angles and spacings can be employed without departing from the broad contours of the present invention. However, the approximately 2° angle from camera to camera, in the nine camera set-up illustrated in the figures, provides a 16° view of the target 40 which permits good depth of field in the lenticular image at a target distance of between about 6.5 feet to about 15.0 feet, and more preferably in the range of about 7 to about 9 feet, and most preferably at a fixed distance of 8 feet. Additional or fewer cameras can be provided, as will be appreciated by persons of ordinary skill in the art, but nine cameras is preferred for its ability to provide sufficient granularity across a viewing angle similar to that of the naked eye. However, a selection of the number of cameras and focal distance as described above is desirable because the image is not flat and does not suffer from "flipping."

Figure 3:
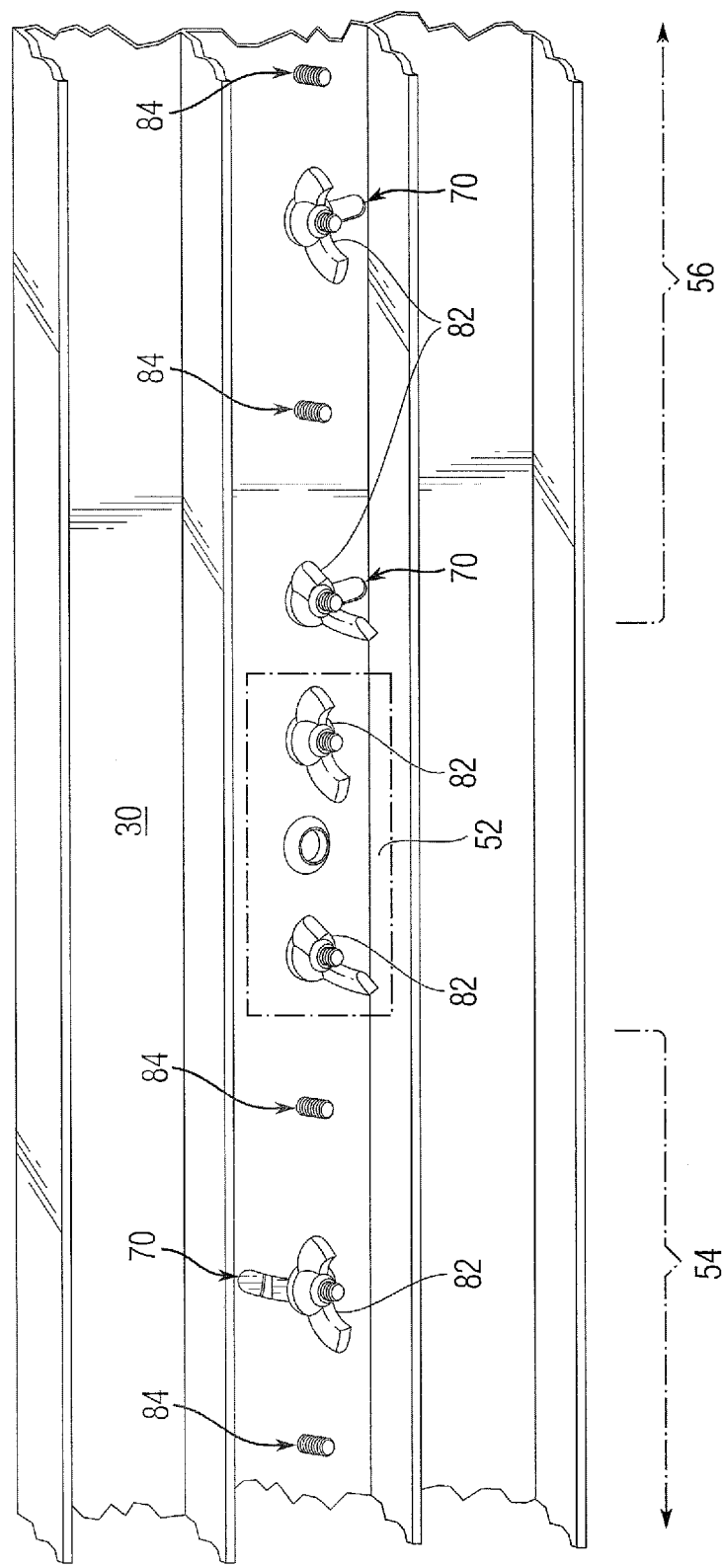
FIG. 3 is a bottom view of the jig of FIG. 1.

In order to ensure convergence and good image quality, the jig 10 preferably is configured to permit micro-alignment of the camera angle relative to the perpendicular P. Referring now to FIG. 3, an underside of the platform 30 shows channels 70 that permit pivotal movement of the brackets in the sets 54, 56. As noted above, the bracket 52 can be secured against any movement at all, such as by using a pair of wing nuts 82 that tighten down against the platform 30 at no less than two locations. On the other hand, the brackets in the sets 54, 56 include a tap screw 84 that secures one end of the bracket 50 to the platform while permitting another portion of the bracket to pivot about that screw. A second screw and wing nut 82 are disposed within the channel 70 and can be micro-aligned and secured in a selected position, along the track of the channel, to secure the brackets in those sets to the platform. When the wing nuts 82 are tightened, the brackets in the sets 54, 56 are secured against any further pivotal movement.

Figure 4:
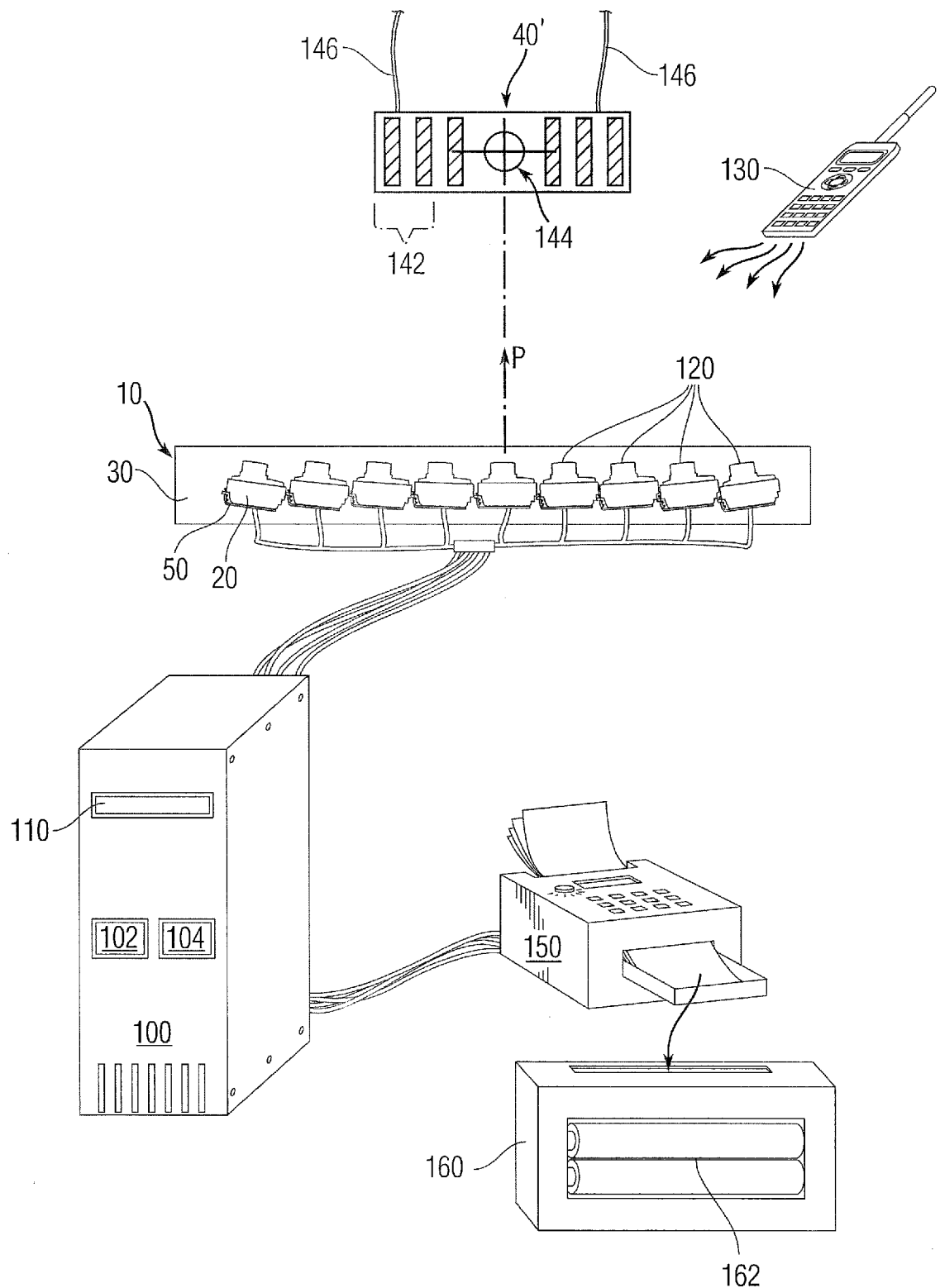
FIG. 4 is a schematic illustration of various components and connections that comprise a system in accordance with a further aspect of the present invention.

Turning next to FIG. 4, a schematic arrangement of various components and connections is provided to further describe a system constructed in accordance with further aspects of the present invention. The arrangement of FIG. 4 includes a jig 10 having a platform 30 that supports brackets 50 and cameras 20. In order to create an interlaced image for stereoscopic presentation, the arrangement is implemented using a computer having at least a processor 102 and a memory 104, as well as sundry other components to make the computer operative. For example, the computer can be a Hewlett-Packard computer having a dual core AMD processor, 2 GB of memory and an operating system such as Microsoft Windows XP. In any event, the particular hardware used in the arrangement of FIG. 4 can be varied without impacting the invention.

The arrangement includes code 110 that is executable by the processor 102, such as may be provided by a software program resident in the memory 104. The code 110 is operative to interlace bands of images captured from each of the plurality of cameras. Code that performs this particular functionality is known in the art.

Preferably, the captured images from the plural cameras are gathered substantially simultaneously so that all of the images are from nearly a single point in time. In order to capture images in this way, the cameras are operatively coupled to a trigger mechanism 120 that causes the shutters of each of the cameras to open and close at nearly the same moment. In FIG. 4, the trigger mechanism is illustrated as an infrared sensor 120 on the body of each camera that is coupled to shutter-activation circuitry in a conventional manner. The sensor 120 can receive an IR command-code from a transmitter 130, such as a universal remote control, that bathes each of the sensors with a common command-code when the transmitter is activated. In other arrangements, a hard-wired or other wireless controller can be used to trigger the cameras for simultaneous operation.

In operation, the cameras 20 are aimed at an aiming device 40' that is preferably constructed to provide both a focus target 142 and a sizing reference 144. The focus target can be a high-contrast pattern that permits the camera or its operator to ensure proper focus by defining a focal position for the lenses to focus upon even before the subject of the photograph is in position. Black and white stripes are suitable for this purpose. The sizing reference 144 preferably comprises an object of known size, such as cross-hairs, or the stripes themselves. Because the camera attached to bracket 52 at the center of the array is closer to the target than the cameras at the periphery, the size of the image captured by the different cameras will vary. The code 110 is preferably operative to use image recognition techniques to identify the sizing reference 144 from within the captured image from each camera, and process the so-identified object to arrive at a scaling coefficient. The image from that camera can then be adjusted in size, e.g., expanded in all of its dimensions, to match the size of the other images. Thus, the code 110 can process each of the images and extract a sizing parameter for each image and adjust the images relative to each other so that all of the images have the same scale. After this processing, the so-adjusted image can be included in the interlaced image. In this way, distortion in the interlaced image is reduced.

Optionally, the aiming device 40, 40' is positionable such as by movement into and out of the field of view of the camera lenses, such as by leads 146. Alternatively, the aiming device can be stationary and cropped or otherwise digitally removed from the interlaced picture.

The arrangement of FIG. 4 can further include a printer 150 coupled to the computer 100 in order to output the interlaced image onto a chosen medium such as paper or onto the rear (smooth) surface of a lenticular lens. The printer can comprise a lithographic-offset printer having a resolution on the order of tens of microns to ensure high quality images and alignment to lenticular lens arrays. Also shown in FIG. 4 is an optional laminator 160 that can receive the printer output, when the output is a paper or polymer substrate, and laminate the interlaced image in register with a lenticular lens in a heat or pressure press 162.

Portions of the background discussion may be subject to copyright and are licensed for use in this document under the GNU Free Documentation License available on the world wide web at gnu.org/copyleft/fdl.html, because the background discussion uses material from the Wikipedia article Lenticular Printing, en.wikipedia.org/wiki/Lenticular_printing (as of Apr. 2, 2009, 02:17 GMT).

As will be apparent to one skilled in the art, various modifications can be made within the scope of the invention description. Such modifications being within the ability of one skilled in the art form a part of the present invention and are embraced by the recitations in the claims set forth below and equivalents thereof.

We claim:

1. A jig for supporting a plurality of cameras, comprising:
   a. a platform; and
   b. a plurality of brackets, each connectable to a respective one of the plurality of cameras and secured to the platform in an arcuate array;
   wherein a first bracket in the plurality of brackets is immovably secured to the platform at a center of the arcuate array,
   wherein a set of second brackets among the plurality of brackets is pivotally connected to the platform on a left side of the first bracket and pivotable toward the first bracket,
   wherein a set of third brackets among the plurality of brackets is pivotally connected to the platform on a right side of the first bracket and pivotable toward the first bracket, and
   wherein each bracket in the second and third sets of brackets is secured to the platform at no less than two locations, in which a first of the two locations provides a pivot point.

2. The jig of claim 1, further comprising a level mounted to the platform.

3. The jig of claim 1, wherein each bracket in the second and third sets of brackets is securable against pivotal movement in a position.

4. The jig of claim 3, wherein an angle between one of the plurality of brackets and a next bracket in the array is approximately 2°.

5. The jig of claim 3, wherein the array supporting the plurality of brackets defines an arc segment of approximately 16°.

6. The jig of claim 1, wherein the platform has a plurality of channels defined therein and wherein a second of the two locations is located within a respective channel in the platform.

7. The jig of claim 3, further comprising nine cameras as the plurality of cameras.

\* \* \* \* \*